United States Patent [19]

Sardessai et al.

[11] 4,079,031
[45] Mar. 14, 1978

[54] IMPROVED FOUNDRY PROCESS AND BINDER RESIN COMPOSITION THEREFOR

[75] Inventors: Kashinath S. Sardessai, Whitefish Bay; Jordan J. Kopac, Franksville, both of Wis.

[73] Assignee: Delta Oil Products Corporation, Milwaukee, Wis.

[21] Appl. No.: 705,105

[22] Filed: Jul. 14, 1976

[51] Int. Cl.² .................. C08G 8/10; C08G 18/48; B22C 1/22; C08K 5/06
[52] U.S. Cl. ............................ 260/37 N; 164/43; 252/182; 260/33.2 R; 260/33.6 UB; 260/47 CB; 260/77.5 AP; 260/DIG. 40; 260/77.5 AB; 260/77.5 AC
[58] Field of Search ............. 260/77.5 AP, 47 CB, 260/DIG. 40, 33.2 R, 37 N

[56] References Cited

U.S. PATENT DOCUMENTS

| | | | |
|---|---|---|---|
| 3,106,540 | 10/1963 | Freedman | 260/DIG. 40 |
| 3,288,745 | 11/1966 | Hempel et al. | 260/33.2 R |
| 3,409,579 | 11/1968 | Robins | 260/38 |
| 3,598,771 | 8/1971 | Davis et al. | 260/47 CB |
| 3,676,392 | 7/1972 | Robins | 260/38 |
| 3,702,316 | 11/1972 | Robins | 260/DIG. 40 |
| 3,726,867 | 4/1973 | Robins | 260/33.2 R |
| 3,933,727 | 1/1976 | Schmid | 260/37 N |

FOREIGN PATENT DOCUMENTS

| | | | |
|---|---|---|---|
| 1,363,227 | 8/1974 | United Kingdom | 260/33.2 R |

*Primary Examiner*—H.S. Cockeram
*Attorney, Agent, or Firm*—Cook, Wetzel & Egan, Ltd.

[57] ABSTRACT

An improved binder resin is disclosed for use in a foundry process, comprising a major proportion of a resole phenolic resin and a minor proportion of a polyether polyol and a mutual solvent therefor, wherein the polyol has an average molecular weight between about 200 and 5000 and a hydroxy functionality of about 2 to 4. The improved binder is used in the foundry process by mixing it with a polyisocyanate and preferably an amine catalyst.

15 Claims, No Drawings

IMPROVED FOUNDRY PROCESS AND BINDER RESIN COMPOSITION THEREFOR

The present invention relates to novel binder resin compositions based on phenol formaldehyde resins combined with polyether polyols, which when admixed with polyisocyanates, either with or without catalysts, will thermoset to provide coatings or adhesive compositions. The binder resin compositions of the present invention are particularly useful in a foundry process, wherein they are mixed with aggregate materials, are shaped or molded, and are then thermoset to form cores or molds into which hot metal may be poured. The present invention also relates to a catalyst system which is particularly useful with the binder resin compositions in the foundry process.

PRIOR ART

The use of curable phenolic resins as binders in the foundry art is well known. Public knowledge abounds with a wealth of literature since Baeyer first reported the development of phenolic resins in 1872 (*Chem. Ber.* 5, 25, 280, 1094), and numerous books have been written on the subject of phenol-formaldehyde resin chemistry, as well as the preparation of these resins.

Phenol-formaldehyde resins have been used for many years in a foundry process, either alone or in combination with other resins, wherein they are cured in the presence of acid catalysts and/or heat. In particular, the resole-type of phenol-formaldehyde resins have found extensive use in the foundry process because they can be quickly cured or thermoset using either organic acids or inorganic acids. Typically such resole-type phenolics are cured with toluene sulfonic acid or benzene sulfonic acid which provide a rapid curing and a consequent short strip time in the foundry process.

Although phenols and phenol-formaldehyde resins have been crosslinked with diisocyanates for many years for use in coatings and adhesives, until relatively recently there had been no commercial use of phenol-formaldehyde resins cured or crosslinked with isocyanates in the foundry process. Initial attempts by prior art workers to cure conventional phenol-formaldehyde resins and isocyanates produced foundry shapes or objects which were slow to cure and which had undesirable low tensile strengths and poor mechanical properties. Conventional resole-type phenolic resins which typically contain substantial amounts of water, i.e., 5% by weight or more, also caused mechanical problems in the foundry process when such water-bearing resins were cured with isocyanates, and, according to the prior art, conventional resole resins do not produce useful foundry products.

Special types of phenol-formaldehyde resins have been described in the patent literature for use in conjunction with isocyanates to prepare foundry sand mixes for which foundry articles are shaped or molded — See U.S. Pat. Nos. 3,676,392; 3,726,867; 3,702,316; 3,485,797; and 3,432,457. U.S. Patents 3,676,392, 3,485,797 and 3,726,867 teach such special types of phenol-formaldehyde resins "containing benzylic ether linkages and unsubstituted para positions" (Formula I, below) which are prepared by using special metal ion catalyst.

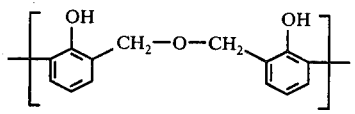

These special phenolic resins of prior art have been defined (U.S. Pat. No. 3,485,797, column 4, line 1) as containing "more dimethylene ether/linkages between the phenolic rings than methylene linkages. This excess is necessary in order to achieve the superior properties of the phenolic resins of the present invention." These patents assert that the phenolic-formaldehyde resins containing the benzylic ether linkages are necessary to make good foundry cores and molds from said mixes prepared from such phenol-formaldehyde resins and isocyanates.

Resole-type phenol-formaldehyde resins are conventionally prepared using an alkaline catalyst, such as sodium hydroxide in the presence of excess formaldehyde. The reaction under these conditions, which is illustrated in Formula II, below, leads to the formation of resin containing more methylene linkages between the phenol rings, shown a (B) in Formula (II), as compared to the benzylic ether structure shown as (A).

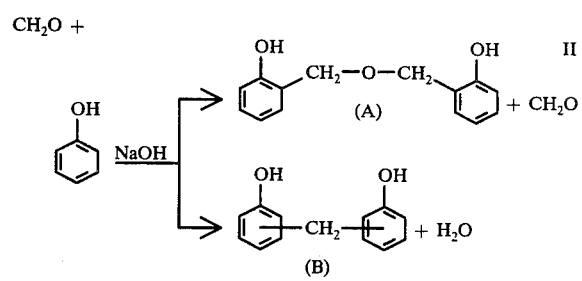

It has been shown that under strongly alkaline conditions of resin formation, the most significant self condensation reaction of methylol phenols is that which leads to the formation of resins containing methylene linkages between phenol rings —See W. H. Carothers, U.S. Pat. No. 3,071,252, 1937. These resins are termed as resole resins. Under the strongly alkaline conditions, significant benzylic ether linkages between the phenol rings are not formed —See L. M. Yeddanapalli & D. V. Francis, *Macromol. Chem.* 55, 74, 1962.

THE PRESENT INVENTION

The present invention is based on the discovery that conventional resole phenolic resins, which are taught to be non-useful by the prior art, can be combined with polyether polyols to produce binder resin compositions which can be reacted with polyisocyanates to give crosslinked, thermoset resins which may be usefully employed as coatings and adhesives. More particularly, the binder resin compositions of the present invention may be used with sand or other aggregates to make foundry articles of suitably high tensile strength and good mechanical properties. Further, a resin binder composition produced from a resole-type phenol-formaldehyde resin, produced under alkaline conditions, even in the presence of substantial quantities of moisture, with the addition of polyether polyols thereto, may advantageously be cured or crosslinked with polyisocyanates for use in the foundry process.

Although applicants do not wish to be bound by theory it is postulated that the advantages of the present invention are derived from a novel copolymeric thermoset resin structure which results from the reaction of the resole phenolic resin, the polyether polyol and the isocyanate and which imparts good bonding strength to a foundry mix and the shaped article therefrom. The chemical reaction by which such copolymeric resin is formed is as follows:

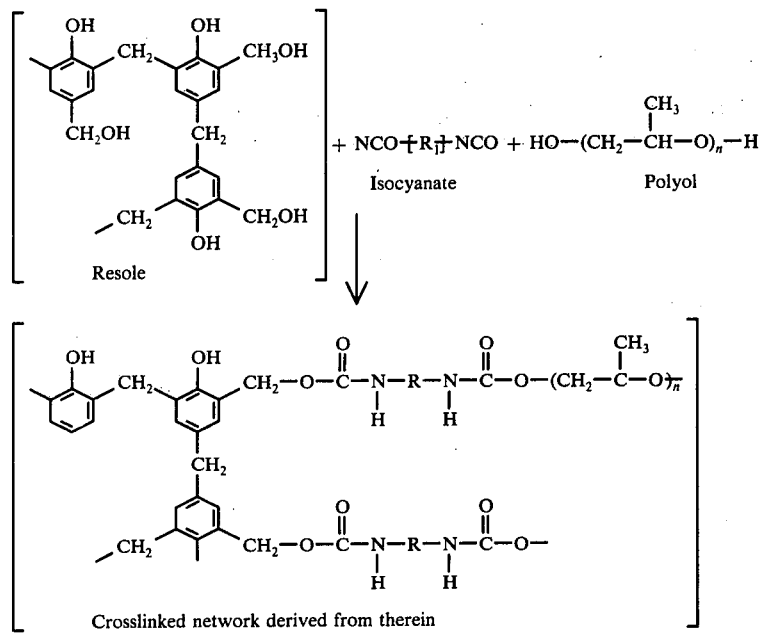

In applying the binder resin compositions of the present invention to the foundry process, it is generally preferred to prepare three separate components, namely:

A. binder resin composition;
B. isocyanate solution; and
C. catalyst solution.

The preferred practice is to use solvents in all three components in order to insure easy mixing of the components with the sand and promote a uniform mixture of the foundry sand with all of the components, although it is possible to use some or all of the components without solvents, provided the viscosity of such components ia adequate to accomplish the required mixing to produce a uniform product.

Generally the foundry process is carried out, by first mixing binder resin composition with the desired amount of aggregate material (typically sand) for use in producing foundry cores and molds. If desired, the catalyst solution may be mixed with the sand at the same time the binder resin composition is mixed. Alternatively the binder resin composition and the catalyst may be pre-mixed together or mixed with the sand sequentially, in either order. Next, an appropriate quantity of isocyanate solution is added to the sand-resin mixture and mixed for a time sufficient to produce a uniform foundry sand mix which is then shaped into desired articles by ramming or blowing into a pattern. The foundry sand mix rapidly cures at room temperature in the shape of the pattern as the isocyanate solution reacts with the binder resin composition.

In producing the binder resin composition, it is essential to use a major proportion of a resole-type phenolic resin, which, as is pointed out above, contains a predominant number of methylene linkages in comparison to the relative quantity of benzylic ether linkages. The resole resin used in connection with the present invention may be a conventionally prepared resole resin of the well-known type produced from either unsubstituted phenols or substituted phenols. If desired, the resole phenolic resin may be mixed with a relatively small amount of a novolac resin, and for some purposes, it is preferred to use a mixture of the two. It is not necessary to dehydrate the resole resin in order to remove all moisture, and it has been found that resole resins having a moisture content between about 5 and 10% by weight produce useful results.

The polyether polyols which are used in the binder resin compositions must be poly-hydroxyfunctional liquids having a molecular weight between about 200 and 5,000. Polyether polyols used in the present invention may be prepared by reacting alkylene oxides such as ethylene oxide or propylene oxide with such precursors as propylene glycol, 1,4-butane diol to form poly-(oxyalkylene) glycols, or poly(oxypropylene)-poly(oxyethylene) glycol block copolymers which may be hydroxyl terminated, or with triols such as glycerin, trimethylol propane, trimethylol ethane and castor oil to form the corresponding polyoxypropylene or polyoxyethylene adducts. Tetrols or compounds of higher functionality also may be similarly reacted. Also, polymers and copolymers prepared from hydroxy alkyl acrylates or methacrylates with other ethylenically unsaturated monomers, poly(oxypropylene-poly(oxyethylene) and adducts of pentaerythritol or glycerin may be suitable in this invention. Although polyether polyols are preferred, the present invention also contemplates the use of other hydroxyl-bearing species, such as polyesters and the like.

The relative ratio of polyol to phenol-formaldehyde resin may vary over substantial limits, depending upon the exact end use to which the composition is to be used. However, it is generally desired to use at least 10% by weight of the polyether, based on the weight of the phenolic resin in order to achieve increased tensile, and as much as 40% by weight of the polyether based on the weight of the phenolic resin may be advantageously used. However, as the amount of polyether approaches the weight of the phenolic resin, i.e., approaches 100%, the hot strength of the foundry shapes may be reduced to undesirably low levels.

As was mentioned above, it is generally desired to include a solvent in the binder resin composition in order to lower the viscosity and provide for increased mixability with the sand. The particular type of solvent which is used is not critical, so long as the solvent is inert with respect to the phenol formaldehyde resin, the polyether polyol, and the isocyanate. The solvent used may conveniently be a mixture of solvents which includes conventional solvents for resole resins as well as solvents for the isocyanates. It is preferred to use a solvent or a solvent mixture which is compatible with the phenolic resin, the polyether polyol, and the polyisocyanate. Good results have been achieved using a mixture of moderately polar solvent and aromatic solvent, as is illustrated by the examples below. Suitable aromatic solvents include benzene, toluene, xylene, ethyl benzene, naphthalene and the like. Suitable moderately polar solvents include butyl cellosolve acetate, butyl carbital, and the like.

The quantity of solvent used will depend in part on the viscosity of the resole resin and in part on the molecular weight of the polyether polyol being employed. Therefore the quantity of solvent used in the binder resin composition may vary over wide limits. The examples below illustrate binder resin compositions made up of approximately 50 parts by weight of resole phenolic resin, 20 parts by weight of polyether polyols and 30 parts by weight of solvents.

In the preparation of isocyanate solution of the present invention, numerous polyisocyanates, including di and triisocyanates may be employed. Suitable isocyanates are the aromatic, aliphatic and cycloaliphatic isocyanates and include triphenyl-methane triisocyanate; naphthlene diisocyanate; 4-tert-butyl-m-phenylene diisocyanate; 4,4'-methylene bis(o-tolyl isocyanate); 4,4'-methylene bis(phenyl isocyanate); m-phenylene diisocyanate; 4-chloro 3,3-phenylene diisocyanate; 4,4'-biphenylene diisocyanate; 1,5-naphthylene diisocyanate; 1,4-tetramethylene diisocyanate; 1,10-decamethylene diisocyanate; 1,4-cyclohexylene diisocyanate; 4,4'-methylene bis(cyclohexyl isocyanate); 1,5-tetrahydronaphthylene diisocyanate; toluene-2,4-diisocyanate; 4-chloro--1,3-phenylene diisocyanate; ethylene diisocyanate; ethylidene diisocyanate; propylene 1,2-diisocyanate; cyclohexylene-1,2-diisocyanate; 3,3'-dimethylbiphenylene-4,4'-diisocyanate; 3,3'-dimethoxybiphenylene-4,4'-diisocyanate; 3,3'-diphenylbiphenylene-4,4'-diisocyanate; 3,3'-dichlorobiphenylene-4,4'-diisocyanate; triphenylene p-p', p"-triisocyanate; furfurylide diisocyanate; benzene triisocyanate; hexane-1,2,6-triisocyanate; 2,2,4-trimethylhexamethylene diisocyanate; methyl-2,6-diisocyanatocaproate; 4-methyl-1,3-diisocyanatocyclohexane; 4,4'-methylene bis(cyclohexyl isocyanate); methane diisocyanate; N,N'N"-tris(6-isocyanatohexamethylene)biuret; 1-chloro-2,4-diisocyanatobenzene; tris(4-isocyanatophenyl) methane; naphthalene diisocyanates; bis(2-isocyanatoethyl) benzene; isophorone diamine diisocyanate; triphenylsulfone triisocyanate; trimethylbenzene-2,4,6-triisocyanate; 1-methylbenzene-2,4,6-triisocyanate; diphenyl-2,4,4'-triisocyanate; and 1,6-hexamethylene diisocyanate. The isocyanate part of the present invention is desirably used as a solution in a suitable solvent because the reduced viscosity improves the uniformity of the sand coating. It is possible to use the isocyanate without a solvent.

The binder resin compositions of the present invention may be cured either with or without a catalyst, but it is preferred to use a catalyst. Conventional catalysts which promote the urethane-forming reaction, including those which are liquid and those which are gaseous, may be used. The preferred catalyst system comprises an amine catalyst in combination with a small amount of organo-metallic co-catalyst.

When a liquid catalyst system is to be used, the main catalyst may comprise any of the standard urethane amino-type catalysts, although certain heterocyclic bases are preferred. The catalyst may comprise an amine catalyst, either primary, secondary or tertiary, and which may be aliphatic, cycloaliphatic or heterocyclic based. In particular, 4-picoline and 4-phenyl propyl pyridine are the preferred amine catalysts which most preferably are used in combination with a small amount of an organo-metal catalyst, such as dibutyl tin dilaurate. Other amines which may be used include dimethylethanolamine, diethyl cyclohexylamine, dimethylanaline, pyridine, pyridine derivatives, triethyl amine, N-methyl morpholine, tetramethyl 1,3-butanediamine, imidiazoles, 1-methyl imidiazole, and the like.

It has been discovered that the addition of small amounts of organo-metallic compounds to the base catalyst helps to develop tensile strength very rapidly during the first 1 to 4 hours, and for that reason it is preferred to use a small amount of an organo-metal co-catalyst. Organo-metal compounds which may be used include dibutyl tin diacetate, the various metal naphthanates such as tin, lead, cobalt, iron, manganese and the like, phenyl mercuryl proponate and similar mercuric compounds. Further suitable and useful catalysts are listed in "Polyurethane, Part I", Saunders and Frisch, page 212 (Interscience Publishers, 1962).

As is shown in the accompanying examples, it is preferred to use the amine catalyst as the main catalyst in the presence of from about 0.1 to about 5% by weight of the organo-metallic co-catalyst, based on the weight of the amine catalyst.

The present invention also contemplates the use of gaseous amines to cure the binder compositions of the present invention. Preferably the gaseous amine is a tertiary amine such as trimethylamine, although normally liquid tertiary amines such as triethylamine may be used if they are maintained in a suitably volatile form or are suspended in a gaseous medium and then passed through the mold or core. Dimethylethanol amine or other amines which have functional groups which do not interfere with the catalytic action of the amine may also be used. The gaseous amines may be used either with or without the organo-metallic co-catalyst. In the event the organo-metallic co-catalyst is to be used, it is preferably premixed with the sand and the binder resin composition, followed by mixing with the isocyanate solution. In this way, when the gaseous amine catalyst is brought in contact with the foundry mix, the organo-metallic co-catalyst will already be in position, thereby enabling a prompt reaction and curing of the binder composition.

The quantity of catalyst used should be regulated to obtain the cure and strip time desired for the foundry object being produced. This depends, in part, on the quantity of binder resin composition used with each measure of sand and in part on the size of the core or mold being produced. Desirably the binder resin is kept as low as possible for economical reasons, in keeping with achieving the required tensile strength to promote prompt stripping and the required hot strength. Although useful cores and molds may be made using less than 1% by weight of the resin binder compositions (exclusive of solvents), based on the weight of the sand, larger amounts may be added if higher tensile strength is required. Generally from about 1.5% to about 5% by weight of the resin binder composition (exclusive of solvents) based on the weight of the sand or other aggregates gives useful results.

The following examples serve to illustrate the preparation and use of several binder resin compositions and catalyst systems within the scope of the present invention. These examples also present comparative data outside the scope of the present invention, but it is understood that these examples are set forth merely for illustrative purposes and many other binder resin compositions and catalyst systems are within the scope of the present invention.

EXAMPLE 1

A resole resin was prepared using a conventional procedure, using the process very similar to that outlined in "Preparative Methods of Polymer Chemistry" by W. R. Sorenson and T. W. Campbell (Interscience Publishers, New York, 1968 edition, Chapter 7, page 455: cross reference, office of Tech. Serv. U.S. Dept. of Commerce, Washington, D.C., P.B. report 25,642 of year 1945), a standard textbook in the polymer field.

To a resin kettle equipped with stirrer, reflux condenser and thermometer were charged with 57.6 parts of phenol (USP grade) 42.4 parts of formalin (52% solution) and 2 parts of sodium hydroxide (25% solution in water). The resin kettle was heated and the temperature was maintained at 75° to 78° C. The reaction is allowed to proceed under reflux, until a free formaldehyde level of 0.3% is attained. The reaction mixture is then cooled to approximately 50° C. and the pH of the reaction is adjusted to about 4.0 by adding sufficient toluene sulfonic acid (30% in water). The reaction kettle was then set for vacuum distillation at approximately 55° C. and 26 inches of vacuum. Distillation was continued until a water content of the resin was about 5.5% (Karl Fisher method).

Using the above resole resin, the following binder resin composition, isocyanate solution and catalyst solution were prepared.

| A. Binder resin compositon (BRC-1) was prepared by mixing together the following: Chemicals | Parts |
|---|---|
| Resole resin | 70 |
| Butyl cellosolve acetate | 22 |
| Aromatic hydrocarbon solvent (SC-100) | 8 |
| B. Isocyanate Solution (IS) was prepared from: | |
| 1. Methylene bis(phenyl isocyanate) (Rubinate M) | 85 |
| 2. Aromatic hydrocarbon solvent (SC-100) | 15 |
| C. Catalyst solution (CS) was made using the following: | |
| 1. 4-Phenyl propyl pyridine | 60 |
| 2. Aromatic hydrocarbon solvent (SC-100) | 40 |

A foundry sand mix was prepared by admixing in a Hobart Mixer (Model N-50) 2,000 parts of Fairwater F-125 sand, 20 parts of the binder resin composition (BRC-1) and 1 part of the catalyst solution. A uniform mix was obtained after one minute of mixing. Twenty parts of the isocyanate solution was added to the sand mix and a uniform foundry sand mix was obtained after 1 minute of additional mixing. Standard AFS tensile test specimens were made from the above foundry sand mix, using the standard foundry procedure. The test specimens were cured at room temperature.

The above foundry mix had a work time of 2 minutes and a strip time of 6.5 minutes. Work time is defined as the time required to reach a green hardness of 60 from the time isocyanate solution was added to the mix. The strip time is defined as the time required to reach a green hardness of 90 from the time the isocyanate solution was added to the mix. Also strip time is the time at which the foundry article could be taken out of the mold.

The cured specimen showed the development of the following tensile strength:

| Tensile Strength After | Tensile Strength (in P.S.I.) |
|---|---|
| 1 hour | 70 |
| 2 hours | 92 |
| 4 hours | 130 |
| 24 hours (open to air) | 111 |
| 24 hours (dry) | 175 |

EXAMPLE 2

Using the resole resin of Example 1, another binder resin composition was prepared. Binder resin composition (BRC-2) was prepared by mixing together the following:

| Chemicals | Parts |
|---|---|
| Resole resin of Example 1 | 50 |
| Butyl Cellosolve acetate | 36 |
| Aromatic hydrocarbon solvent SC-10 | 14 |

Following the procedure of Example 1, a foundry sand mix was prepared using:

| | |
|---|---|
| Fairwater F-125 sand | 2,000 parts |
| Binder resin composition (BRC-2) | 20 parts |
| Isocyanate solution (Example 1) | 20 parts |
| Catalyst solution (Example 1) | 1 part |

AFS tensile test specimen samples were prepared from the resulting foundry sand mix, using the standard procedure. The foundry mix had a work time of 5 minutes and a strip time of 9 minutes. The specimen samples were cured at room temperature, as in Example 1, and they showed the development of the following strength:

| Tensile Strength after | Tensile Strength (psi) |
|---|---|
| 1 hour | 62 |
| 2 hours | 75 |
| 4 hours | 100 |
| 24 hours (open to air) | 106 |
| 24 hours (dry) | 165 |

EXAMPLE 3

Using the resole resin of Example 1, a binder resin composition in accordance with the present invention was prepared. Binder resin composition (BRC-3) was prepared by mixing together the following:

| Chemicals | Parts |
|---|---|
| Resole resin of Example 1 | 50 |
| Polyoxypropylene glycol (Pluracol P-410 from BASF Wyandotte Corp. having a molecular weight of about 425) | 20 |
| Butyl Cellosolve acetate | 22 |
| Aromatic hydrocarbon solvent SC-100 | 8 |

Following the procedure of Example 1, a foundry sand mix was prepared, using:

| | |
|---|---|
| Fairwater F-125 Sand | 2,000 parts |
| Binder resin composition (BRC-3) | 20 parts |
| Isocyanate solution (Example 1) | 20 parts |
| Catalyst Solution (Example 1) | 1 part |

AFS tensile test specimen samples were prepared from the resulting foundry sand mix, using the standard procedure. The foundry sand mix had a work time of 2.5 minutes and a strip time of 7 minutes. The specimen samples were cured at room temperature, as in Example 1 and they showed the development of the following tensile strength:

| Tensile Strength after | Tensile Strength (p.s.i.) |
|---|---|
| 1 hour | 72 |
| 2 hours | 110 |
| 4 hours | 172 |
| 24 hours (open to air) | 200 |
| 24 hours (dry) | 228 |

EXAMPLE 4

Using the resole resin of Example 1, another binder resin composition was prepared in accordance with the present invention. Binder resin composition (BRC-4) was prepared by mixing together the following:

| Chemicals | Parts |
|---|---|
| Resole resin of Example 1 | 50 |
| Polyoxypropylene glycol (Pluracol P-410) | 10 |
| Commercial polyoxypropylenglycolether (Pluracol P-710 from BASF Wyandotte Corp. having a molecular weight of about 730) | 10 |
| Butyl Cellosolve acetate | 22 |
| Aromatic hydrocarbon solvent SC-100 | 8 |

Following the procedure of Example 1, a foundry sand mix was prepared using:

| | |
|---|---|
| Fairwater F-125 sand | 2,000 parts |
| Binder resin composition (BRC-4) | 20 parts |
| Isocyanate Solution (Example 1) | 20 parts |
| Catalyst Solution (Example 1) | 1 part |

AFS tensile test specimen samples were prepared from the resulting foundry sand mix, using the standard procedure. The foundry sand mix had a work time of 2.5 minutes and a strip time of 6.5 minutes. The specimen samples were cured at room temperature and, they showed the development of the following tensile strength:

| Tensile Strength after | Tensile Strength (p.s.i.) |
|---|---|
| 1 hour | 70 |
| 2 hours | 120 |
| 4 hours | 176 |
| 24 hours (open to air) | 210 |
| 24 hours (dry) | 254 |

Table 1 compares the development of tensile strength by using the binder resin compositions BCR-1, BCR-2, BCR-3 and BCR-4 of Examples 1, 2, 3 and 4, respectively.

Examples 5, 6, and 7 show the synergistic effect in the development of early tensile strength (during 1 to 4 hours) of foundry articles, by adding organo-metallic compounds, such as dibutyl tin dilaurate, to the amine catalyst solution.

EXAMPLE 5

A catalyst solution (CST) was made by using the following:

| | |
|---|---|
| 1. 4-Phenyl propyl pyridine | 60 parts |
| 2. Aromatic hydrocarbon solvent (SC-100) | 40 parts |
| 3. Dibutyl tin dilaurate | 0.80 parts |

Following the procedure of Example 1, a foundry sand mix was prepared using:

| | |
|---|---|
| Fairwater F-125 | 2,000 parts |
| Binder resin composition (Example 1 BRC-1) | 20 parts |
| Isocyanate solution (Example 1 IS) | 20 parts |
| Catalyst solution (CST) | 1 part |

AFS tensile specimen samples were prepared from the resulting foundry sand mix, using the standard procedure. The foundry sand mix had a work time of 2 minutes and a strip time of 6 minutes. The specimen samples were cured at room temperature, as in Example 1 and they showed the development of the following tensile strength:

| Tensile Strength after | Tensile Strength (p.s.i.) |
|---|---|
| 1 hour | 102 |
| 2 hours | 133 |
| 4 hours | 135 |
| 24 hours (open to air) | 112 |
| 24 hours (dry) | 168 |

EXAMPLE 6

Following the procedure of Example 1, a foundry sand mix was prepared using:

| | |
|---|---|
| Fairwater F-125 sand | 2,000 parts |
| Binder resin composition Example 2 (BRC-2) | 20 parts |
| Isocyanate solution Example 1 (IS) | 20 parts |
| Catalyst solution Example 5 (CST) | 1 part |

AFS tensile specimen samples were prepared from the resulting foundry sand mix, using the standard procedure. The foundry sand mix had a work time of 4.5 minutes and a strip time of 7 minutes. The specimen samples were cured at room temperature, as in Example 1 and, they showed the development of the following tensile strength:

| Tensile Strength after | Tensile Strength (p.s.i.) |
|---|---|
| 1 hour | 76 |
| 2 hours | 116 |
| 4 hours | 115 |
| 24 hours (open to air) | 117 |
| 24 hours (dry) | 142 |

EXAMPLE 7

Following the procedure of Example 1, a foundry sand mix was prepared using:

| | |
|---|---|
| Fairwater F-125 sand | 2,000 parts |
| Binder resin composition Example 3 (BRC-3) | 20 parts |
| Isocyanate solution Example 1 (IS) | 20 parts |
| Catalyst solution Example 5 (CST) | 1 part |

AFS tensile specimen samples were prepared from the resulting foundry mix, using the standard procedure. The foundry sand mix had a work time of 2.5 minutes and a strip time of 7 minutes. The specimen samples were cured at room temperature, as in Example 1, and they showed the development of the following tensile strength:

| Tensile Strength after | Tensile Strength (p.s.i.) |
|---|---|
| 1 hour | 108 |
| 2 hours | 170 |
| 4 hours | 190 |
| 24 hours (open to air) | 202 |
| 24 hours (dry) | 245 |

Table 1, below, summarizes the results of Examples 1–7, inclusive.

TABLE 1
Summary of Tensile Strength Development In Examples 1 to 7

| | Binder Resin Composition Parts | | | | | Tensile After | | | | |
|---|---|---|---|---|---|---|---|---|---|---|
| Example | Resole | Polyether Polyol P-410 | Polyether Polyol P-710 | Butyl Cellosolve Acetate | Aromatic Solvent SC-100 | 1 hr. | 2 hrs. | 4 hrs. | 24 hrs. open air | 24 hrs. dry |
| 1 | 70 | — | — | 22 | 8 | 70 | 92 | 130 | 111 | 175 |
| 2 | 50 | — | — | 36 | 14 | 62 | 75 | 100 | 106 | 165 |
| 3 | 50 | 20 | — | 22 | 8 | 72 | 110 | 172 | 200 | 228 |
| 4 | 50 | 10 | 10 | 22 | 8 | 70 | 120 | 176 | 210 | 254 |
| 5[a] | 70 | — | — | 22 | 8 | 102 | 133 | 135 | 112 | 168 |
| 6[a] | 50 | — | — | 36 | 14 | 76 | 116 | 115 | 117 | 142 |
| 7[a] | 50 | 20 | — | 22 | 8 | 108 | 170 | 190 | 202 | 245 |

[a]Catalyst-Solution (CST) containing dibutyl tin dilaurate is used.

EXAMPLE 8

Using the resole resin of Example 1, a binder resin composition was prepared in accordance with the present invention. A binder resin composition (BRC-8) was prepared using the following components:

| | Chemicals | Parts |
|---|---|---|
| 1. | Resole resin of Example 1 | 50 |
| 2. | Polytetramethylene ether glycol (Polymeg 650 from Quaker Oats Co. having a molecular weight of about 600) | 20 |
| 3. | Butyl Cellosolve acetate | 22 |
| 4. | Aromatic hydrocarbon solvent SC-100 | 8 |

Following the procedure outlined in Example 1, a foundry sand mix was prepared using:

| | |
|---|---|
| Fairwater F-125 sand | 2,000 parts |
| Binder resin composition (BRC-8) | 20 parts |
| Isocyanate solution Example 1 (IS) | 20 parts |
| Catalyst solution Example 5 (CST) | 1 part |

As in Example 1, standard AFS tensile specimen samples were prepared, which showed the development of the following tensile strength:

| Tensile Strength after | Tensile Strength (p.s.i.) |
|---|---|
| 1 hour | 75 |
| 2 hours | 112 |
| 4 hours | 170 |
| 24 hours (open air) | 184 |
| 24 hours (dry) | 205 |

EXAMPLE 9

A binder resin composition (BRC-9) was prepared in accordance with the present invention from the following:

| Chemicals | Parts |
|---|---|
| Resole resin of Example 1 | 50 |
| Polyoxypropylene glycol (Pluracol P-410 BASF Wyandotte) | 10 |
| Polytetramethylene ether glycol (Polymeg 650 from Quaker Oats) | 10 |
| Butyl Cellosolve acetate | 22 |
| Aromatic hydrocarbon solvent SC-100 | 8 |

Following the procedure of Example 1, AFS tensile specimen samples were made from a foundry sand mix which was prepared from:

| | |
|---|---|
| Fairwater F-125 sand | 2,000 parts |
| Binder resin composition (BRC-9) above | 20 parts |
| Isonate solution (Example 1-IS) | 20 parts |
| Catalyst solution (Example 5-CST) | 1 part |

The tensile specimen sample showed the development of the following strength:

| Tensile Strength after | Tensile Strength (p.s.i.) |
|---|---|
| 1 hour | 112 |
| 2 hours | 138 |
| 4 hours | 183 |
| 24 hours (open air) | 220 |
| 24 hours (dry) | 220 |

EXAMPLES 10 and 11

Using the resole resin of Example 1, two binder resin compositions (BRC-10) and (BRC-11) were prepared, as shown below:

| Components | BRC-10 | BRC-11 |
|---|---|---|
| Resole resin of Example 1 | 45 | 45 |
| Commercial novolak (a viscous liquid novolak, sold as P5878 by Plastics Engineering Co.) | 5 | 5 |
| Polyether Polyol P-410 | — | 20 |
| Butyl Cellosolve acetate | 36 | 22 |
| Aromatic hydrocarbon SC-100 | 14 | 8 |

Foundry sand mixes were prepared from the above resin compositions, and using isocyanate solution (IS) of Example 1 and tin containing catalyst solution (CST) of Example 5. In each case, 2,000 parts of sand, 20 parts of binder resin composition, 20 parts of isocyanate solution (IS) and 1 part of catalyst solution (CST) were used to prepare the foundry sand mixes.

AFS tensile specimen samples prepared from the above mixes showed the development of following tensile strength.

| Foundry Sand Mix from | Strip Time | Work Time | Tensile Strength After | | | | |
|---|---|---|---|---|---|---|---|
| | | | 1 hr. | 2 hrs. | 4 hrs. | 24 hrs. (open) | 24 hrs. (dry) |
| BRC-10 | 3.5 | 12 | 75 | 100 | 125 | 118 | 162 |
| BRC-11 | 2.5 | 7 | 110 | 160 | 202 | 206 | 270 |

EXAMPLES 12 and 13

Using the resole resin of Example 1, two binder resin compositions (BRC-12) and (BRC-13) and a catalyst-solution were prepared.

| A. Binder resin compositions: Components | BRC-12 | BRC-13 |
|---|---|---|
| Resole resin of Example 1 | 70 | 50 |
| Polyether Polyol Pluracol P-410 | — | 20 |
| Ektasolve EE Acetate (Eastman Kodak) | 22 | 22 |
| Aromatic hydrocarbon solvent SC-100 | 8 | 8 |

B. Catalyst Solution was prepared by mixing together the following Chemicals (CST-2):

| Chemical | Parts |
|---|---|
| 4-picoline | 40.00 |
| Hydrocarbon Solvent SC-100 | 60.00 |
| Dibutyl Tin dilaurate | 0.8 |

In Example 12, a foundry sand mix was prepared from 20 parts of a binder resin composition (BRC-12) 20 parts of an isocyanate solution (IS) of Example 1 one part of catalyst solution (CST-2) and 2,000 parts of Fairwater F-125 sand following the procedure of Example 1. AFS tensile specimen samples were prepared from the above foundry sand mix, and the development of tensile strength are compared below, with those of Example 13.

In Example 13, 20 parts of binder resin composition BRC-13, 20 parts of isocyanate solution (IS) of Example 1, one part of catalyst solution (CST-2) and 2,000 parts of Fairwater F-125 sand were used to prepare the foundry sand mix. AFS tensile specimen samples were prepared from the foundry sand mix, using the standard procedure.

Tensile specimen samples of Example 11 and 12 were cured at room temperature. The development of tensile strength in each core is compared below.

| Example | Strip Time Minutes | Work Time Minutes | Tensile Strength After | | | |
|---|---|---|---|---|---|---|
| | | | 1 hr. | 2 hrs. | 4 hrs. | 24 hrs. (dry) |
| 12 | 2.5 | 4.5 | 63 | 80 | 100 | 120 |
| 13 | 2.25 | 4.5 | 117 | 148 | 184 | 226 |

EXAMPLES 14 and 15

Using a resole phenolic resin, similar to the resin described in Example 1, but containing 9.2% water, two binder resin compositions BRC-14 and BRC-15 (Examples 14 and 15, respectively) were prepared as shown below:

A. Binder Resin Compositions:

| Chemical Components | BRC-14 Parts | BRC-15 Parts |
|---|---|---|
| Resole resin (9.2% water) | 60 | 60 |
| Polyether Polyol (Pluracol P-410) | — | 20 |
| Butyl Cellosolve Acetate Solvent | 29 | 14 |
| Aromatic hydrocarbon solvent SC-100 | 10 | 5 |
| 4-Phenyl-propyl pyridine | 1 | 1 |

Foundry sand mixes were prepared from the above binder resin compositions (BRC-14 in Example 14 and BRC-15 in Example 15), using 2,000 parts of Fairwater F-125 sand, 20 parts of binder resin composition and 20 parts of isocyanate solution of Example 1, following a mixing procedure outlined in Example 1. Tensile specimen samples, prepared by following the standard procedure and cured at room temperature showed the development of tensile strength as shown below.

| Example/ Binder | Strip Time minutes | Work Time minutes | Tensile Strength After | | | |
|---|---|---|---|---|---|---|
| | | | 1 hr. | 2 hrs. | 4 hrs. | 24 hrs. (dry) |
| 14/BRC-14 | 5.5 | 15 | 55 | 88 | 118 | 203 |
| 15/BRC-15 | 2.5 | 9.5 | 78 | 120 | 153 | 240 |

The forms of invention herein shown and described are to be considered only as illustrative. It will be apparent to those skilled in the art that numerous modifications may be made therein without departure from the spirit of the invention or the scope of the appended claims.

We claim:

1. The process of preparing shaped foundry products which comprises:
   (a) forming a foundry mix by uniformly distributing a foundry aggregate containing sand as a major constituent in a binding amount of up to 10% based on the weight of the aggregate of a binder resin composition comprising a resole phenolic resin, a minor proportion of a polyether polyol, and a mutual solvent system therefor, said polyol having an average molecular weight between about 200 and 5000 and having an average hydroxyfunctionality between about 2 and 4;
   (b) mixing therewith a polyisocyanate in a concentration of 10 to 500% by weight of the phenolic resin;
   (c) shaping the foundry mix in a mold; and (d) permitting said binder resin composition to react with said polyisocyanate to form a thermoset copolymer and to bind the shaped foundry mix.

2. The process of claim 1, comprising the additional step of passing a gaseous tertiary amine through the shaped foundry mix.

3. The process of claim 1, wherein the foundry mix of (a) includes a tertiary amine catalyst.

4. The process of claim 3, wherein the tertiary amine catalyst is selected from the group consisting of 4-phenyl propyl pyridine and 4-picoline.

5. The process of claim 3, wherein an organo-metallic co-catalyst is added to the tertiary amine catalyst.

6. The process of claim 5, wherein the co-catalyst is an organo-tin compound.

7. The process of claim 5, wherein the co-catalyst is dibutyl tin dilaurate.

8. A process as described in claim 1, wherein the binder resin composition includes from about 10 to about 40% by weight of said polyol, based on the weight of said phenolic resin.

9. A process as described in claim 1, wherein said phenolic resin contains at least 5% by weight of water.

10. A process as described in claim 1, wherein said binder resin composition includes a minor proportion of a novolac phenolic resin.

11. A process as described in claim 10, wherein the binder resin composition includes from about 10 to about 40% by weight of said polyol, based on the weight of said phenolic.

12. A process as described in claim 10, wherein said resole phenolic resin contains at least 5% by weight of water.

13. The process of claim 3, wherein the tertiary amine catalyst is selected from a group consisting of 4-phenyl propyl pyridine and 4-picoline.

14. The process of claim 3, wherein an organometallic co-catalyst is added to the tertiary amine catalyst.

15. The process of claim 3 wherein the order of mixing is sand, binder resin composition, polyisocyanate, and tertiary amine catalyst.

* * * * *